United States Patent [19]

Higashi et al.

[11] Patent Number: 4,652,999
[45] Date of Patent: Mar. 24, 1987

[54] RADIATION IMAGE READ-OUT AND GRADATION PROCESSING METHOD AND APPARATUS WITH MEANS TO SELECT BETWEEN DIFFERENT GAINS FOR GRADATION PROCESSING

[75] Inventors: Nobuaki Higashi; Nobuyoshi Nakajima; Hirosi Tanaka, all of Kanagawa, Japan

[73] Assignee: Fuji Photo Film Co., Ltd., Kanagawa, Japan

[21] Appl. No.: 692,553

[22] Filed: Jan. 18, 1985

[30] Foreign Application Priority Data

Jan. 19, 1984 [JP] Japan .................................. 59-7668

[51] Int. Cl.$^4$ ...................... G06F 15/62; G06F 15/43; A61B 6/00
[52] U.S. Cl. ................................. 364/414; 250/327.2; 358/110; 358/280
[58] Field of Search ...................... 364/414, 558, 553; 250/315.3, 484.1, 336.1, 327.2; 358/111, 110, 280

[56] References Cited

U.S. PATENT DOCUMENTS

| | | | |
|---|---|---|---|
| 4,499,486 | 2/1985 | Favreau | 364/553 |
| 4,575,808 | 3/1986 | Kaneko | 364/558 |
| 4,611,247 | 9/1986 | Ishida | 250/327.2 |

Primary Examiner—Jerry Smith
Assistant Examiner—Gail Hayes
Attorney, Agent, or Firm—Sughrue, Mion, Zinn, Macpeak & Seas

[57] ABSTRACT

In a system for reading out a radiation image stored in a stimulable phosphor sheet and processing the gradation of the image, final read-out is conducted by use of a read-out condition GP determined on the basis of image information obtained by preliminary read-out. On the basis of the image recording portion and/or image recording conditions, the system selects whether to directly subject the output of the final read-out conducted by use of a read-out condition GP to a gradation processing under a gradation processing condition GH predetermined in accordance with the image recording portion and/or image recording conditions or to subject the output to a gradation processing effected by use of a gradation processing condition A(GP)×GH where A(GP) denotes the function determined by the image recording portion and/or image recording conditions.

8 Claims, 6 Drawing Figures

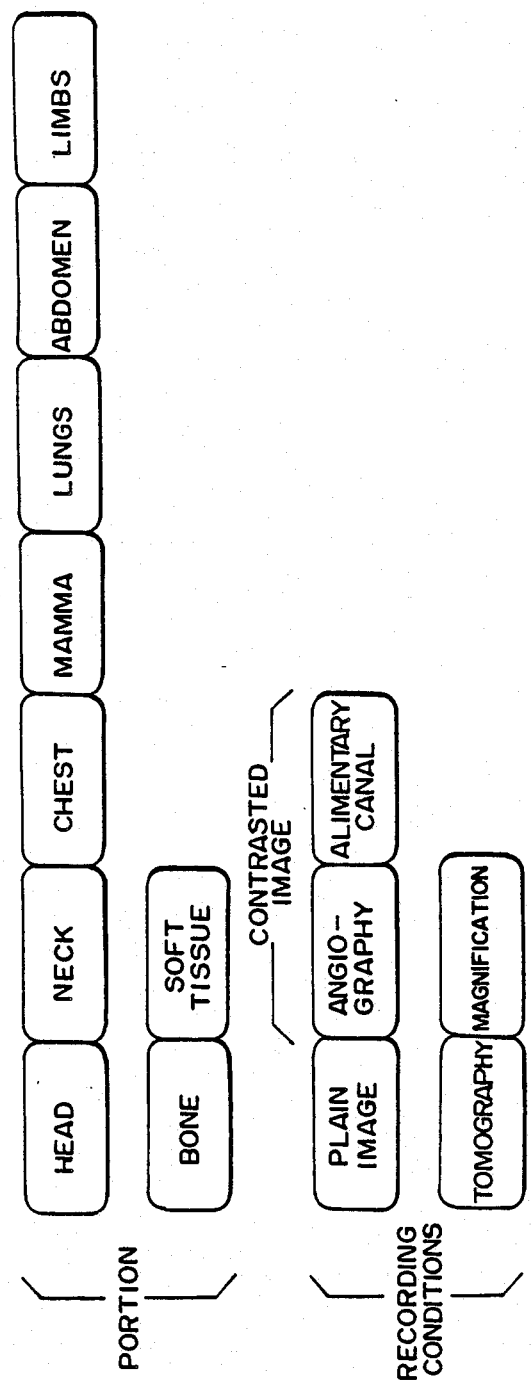

RADIATION IMAGE READ-OUT AND GRADATION PROCESSING METHOD AND APPARATUS WITH MEANS TO SELECT BETWEEN DIFFERENT GAINS FOR GRADATION PROCESSING

BACKGROUND OF THE INVENTION

1. Field of the Invention

This invention relates to a radiation image read-out and gradation processing method for use in a radiation image recording and reproducing system for medical diagnosis or the like, and an apparatus for carrying out the method.

2. Description of the Prior Art

A novel radiation image recording and reproducing system is disclosed, for example, in Japanese Unexamined Patent Publication No. 58(1983)-67240. The system comprises the steps of: (i) scanning a stimulable phosphor sheet carrying a radiation image of an object stored therein by stimulating rays which cause the stimulable phosphor sheet to emit light in proportion to the radiation energy stored, (ii) detecting the emitted light and converting it into an electric image signal by a photoelectric read-out means, (iii) subjecting the electric image signal to a predetermined gradation processing suitable for image viewing, particularly for diagnostic purposes, and (iv) reproducing a visible image on a photographic material or the like on the basis of the gradation-processed image signal.

In the aforesaid radiation image recording and reproducing system, the electric image signal obtained by the photoelectric read-out means in proportion to the amount of the light emitted by the stimulable phosphor sheet is subjected to a predetermined gradation processing for obtaining a visible image or a signal for the visible image suitable for the image recording portion of the object and/or image recording conditions, i.e. suitable for viewing, particularly for diagnostic purposes. The visible image is reproduced on the basis of the gradation-processed electric image signal. (The operation for detecting the electric image signal from the light emitted by the stimulable phosphor sheet by the photoelectric read-out means for obtaining the visible image is hereinafter referred to as the final read-out.) The range of the level of radiation energy stored in the stimulable phosphor sheet is different in accordance with the image recording portion of the object, e.g. the lungs or the heart, and/or image recording conditions used, such as plain image or contrasted image recording. Therefore, when the electric image signal is directly detected from the light emitted by the stimulable phosphor sheet in the final read-out, the electric image signal of a level range which differs in accordance with the image recording portion and/or image recording conditions is fed to the next gradation processing step. This is not advantageous.

Accordingly, in order to feed an electric image signal of approximately the same level range regardless of the image recording portion and/or image recording conditions to the gradation processing step, the aforesaid radiation image recording and reproducing system is constructed so that the final read-out is conducted on the basis of a fixed read-out condition GPO which is predetermined in accordance with the image recording portion and/or image recording conditions.

However, even when the image recording portion and/or image recording conditions are the same, for example, even in the case of plain image recording of the chest, the level range of radiation energy stored in a stimulable phosphor sheet differs in accordance with the thickness of the chest. In this case, if the gradation processing is conducted by use of gradation processing conditions (nonlinear transformation function) predetermined to suit the image recording portion and/or image recording conditions, a problem that arises is that it becomes difficult to grasp all of the effective image information stored in the stimulable phosphor sheet.

To solve the aforesaid problem, an improved method has been proposed, for example, in Japanese Unexamined Patent Publication No. 58(1983)-67240. In the method, a read-out operation for approximately detecting the image information such as the range of the level of radiation energy stored in the stimulable phosphor sheet (hereinafter referred to as the preliminary read-out) is conducted in advance by use of stimulating rays of a level lower than the level of the stimulating rays used in the final read-out, and thereafter the final read-out is carried out. A final read-out condition (read-out scale factor) GP is decided on the basis of the image information obtained by the preliminary read-out, and an electric image signal is obtained from the light emitted by the stimulable phosphor sheet in the final read-out by use of the read-out condition GP.

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the method conducting the preliminary read-out prior to the final read-out, it is possible to obtain an electric image signal processed in advance by use of the read-out condition set to suit the effective image information stored in the stimulable phosphor sheet at the final read-out step, and to feed the electric image signal to the next gradation processing step. Therefore, the gradation processing can be conducted easily without losing the effective image information. As a result, it is possible to easily obtain a visible image having an image quality suitable for viewing, particularly for diagnostic purposes. The function of deciding the read-out condition on the basis of the image information obtained by the preliminary read-out is hereinafter called the automatic sensitivity adjusting function.

However, the read-out and gradation processing system provided with the automatic sensitivity adjusting function has a drawback as described below. For example, in magnification image recording of the lungs, the density range of the lungs in a reproduced visible image where only the image of the lungs is recorded is different from where the image of the lungs is recorded together with that of a bone or the heart, and the image quality of the reproduced visible image becomes low.

FIGS. 1A and 1B are explanatory views showing the density condition of a visible image reproduced by the conventional radiation image recording and reproducing system provided with the automatic sensitivity adjusting function. FIG. 1A is for the case where only the image of the lungs is recorded, and FIG. 1B is for the case where the image of the lungs is recorded together with that of the heart. When only the image of the lungs is recorded in magnification image recording of the lungs conducted by use of the read-out and gradation processing system provided with the automatic sensitivity adjusting function, the amount of X-ray energy stored in the stimulable phosphor sheet is as shown by a histogram curve P in FIG. 1A and is detected in the final read-out by use of the read-out condition (read-out scale factor) GP decided by the preliminary read-out. The electric image signal obtained by the final read-out step is directly fed to the gradation processing step in which the electric image signal is gradation-processed by use of the predetermined gradation processing condition (nonlinear transformation function) GH for magnification image recording of the lungs. The signal obtained by the gradation processing is sent to an image reproducing step and is used to reproduce a visible image on a photographic material or a display device in accordance with gradation characteristics GL at the image reproducing step. In this manner, all of the effective image information is expressed within a predetermined density range D1 to D2 in the visible image.

In general, the aforesaid image reproducing condition GL is of a fixed value inherent to the image reproducing step, i.e. it is fixed by a reproducing apparatus or the like. Also, though the gradation processing condition GH is different in accordance with the image recording portion and/or image recording conditions, it is a fixed value when the image recording portion and/or image recording conditions are the same. For example, in the case of magnification image recording of the lungs, the gradation processing condition GH is a fixed value which is adjusted to suit the magnification image recording of the lungs. Since GH and GL are fixed, in order to obtain a visible image wherein all of the aforesaid effective image information is expressed within the density range D1 to D2, it is necessary to adjust the whole range of the electric image signal generated by the final read-out step to a predetermined range corresponding to the density range D1 to D2. For this purpose, the read-out condition GP is changed by the automatic sensitivity adjusting function to an appropriate value in accordance with the condition of the effective image information.

However, when the image of the lungs is recorded together with that of the heart in the magnification image recording of the lungs, the amount of X-ray energy stored in the stimulable phosphor sheet becomes as indicated by a histogram curve Q in FIG. 1B. In this case, the range of the X-ray amount is extended from a range R of the lungs only to a range S of the heart, and the automatic sensitivity adjusting function automatically adjusts the read-out condition GP so that the extended range R+S corresponds to the predetermined density range D1 to D2. Accordingly, as shown in FIG. 1B, the density range of the lungs in this case becomes D3 to D2, and becomes narrower than the density range D1 to D2 in the case where only the image of the lungs is recorded. Therefore, the image quality, particularly with regard to diagnostic efficiency and accuracy, of the lungs in the visible image reproduced becomes low.

SUMMARY OF THE INVENTION

The primary object of the present invention is to provide a radiation image read-out and gradation processing method which prevents deterioration of diagnostic efficiency and accuracy of an object portion in a reproduced visible image even when the diagnostic efficiency and accuracy of the object portion in the reproduced image is likely to be lowered by the constantly activated automatic sensitivity adjusting function which will sometimes change the gradation of the images of the same object or the images recorded under the same recording conditions.

Stated differently, the object of the present invention is to provide a radiation image read-out and gradation processing method which adjusts the gradation of a desired object portion, for example, the lungs, to a value within the same density range in both cases where only the image of the lungs is recorded and where the image of the lungs is recorded together with that of the heart, thereby improving the image quality, particularly the diagnostic efficiency and accuracy, of the reproduced visible image.

Another object of the present invention is to provide an apparatus for carrying out the method.

The objects are accomplished by conducting the final read-out by use of a read-out condition GP determined on the basis of image information obtained by the preliminary read-out, and deciding on the basis of the image recording portion and/or image recording conditions whether to directly subject the output of the final read-out step conducted by use of the read-out condition GP to a gradation processing under a gradation processing condition GH predetermined in accordance with the image recording portion and/or image recording conditions or to subject said output to a gradation processing effected by use of a gradation processing condition $A(GP) \times GH$ where $A(GP)$ denotes the function determined by the image recording portion and/or image recording conditions.

By the term "image recording portion" is meant the lungs, the chest, the abdomen, or the like. By "image recording conditions" is meant plain image recording, contrasted image recording, magnification image recording, or the like. The aforesaid read-out condition GP designates the scale factor GP at the image read-out step. Light emitted by a stimulable phosphor sheet when it is exposed to stimulating rays is detected by a final read-out means and converted into an electric image signal by use of the read-out scale factor GP, and is sent to the next gradation processing step. By "predetermined gradation processing condition GH" is meant a nonlinear transformation function GH used when the electric image signal generated by the final read-out means is processed for gradation at the gradation processing step. The nonlinear transformation function GH is determined in advance to suit the image recording portion and/or image recording conditions. $A(GP)$ is a function of GP determined by the image recording portion and/or image recording conditions. For example, $A(GP) = k/GP$ where k corresponds to a fixed read-out condition (fixed read-out scale factor) GPO which is determined by the image recording portion and/or image recording conditions.

The apparatus for carrying out the method in accordance with the present invention comprises a first gradation processing means for conducting the gradation processing by use of the gradation processing condition GH, a second gradation processing means for conducting the gradation processing by use of the gradation processing condition A(GP)×GH, and external input means, e.g. pushbuttons, for entering a signal with respect to the image recording portion and/or image recording conditions, and a selection means for selecting said first gradation processing means or said second gradation processing means for processing a signal entered to the gradation processing step on the basis of the signal entered by said external input means.

In the radiation image recording and reproducing system wherein the method and apparatus in accordance with the present invention are used, the density condition (gradation) of the reproduced visible image is restricted by the total gradation GT of the system.

Since the present invention has the configuration as described above, the total gradation GT can be selected from Formulae (1) and (2) in accordance with the image recording portion and/or image recording conditions.

$$GT = GP \times GH \times GL \qquad (1)$$

$$GT = GP \times A(GP) \times GH \times GL \qquad (2)$$

In Formula (2), A(GP) is, for example, k/GP where the fixed read-out condition GPO may be used as k.

Accordingly, in the case where the density range of the image of the lungs necessary for viewing purposes becomes narrow when the read-out condition GP is automatically determined by the image information stored in the stimulable phosphor sheet, for example, the range of exposure dose of X-rays, as in the case where the image of the lungs is recorded together with that of the heart in the magnification image recording of the lungs, it is possible to prevent the density range of the image of the lungs from becoming narrow by processing the gradation by use of Formula (2) which eliminates the effect of GP. In this manner, it is possible to obtain a visible image having the same gradation of the lungs as when only the image of the lungs is recorded. Thus it is possible to obtain a visible image having an improved image quality, particularly a high diagnostic efficiency and accuracy.

Further, the configuration of Formula (2) is such that the final read-out is conducted by use of the read-out condition GP and then GP is multiplied by k/GP as GP×k/GP. This results in the same thing as when the final read-out is conducted by use of the fixed read-out condition k. However, in the present invention, the electric image signal is digitally processed. Therefore, by conducting the final read-out by use of the read-out condition GP determined in accordance with the image information stored in the stimualble phosphor sheet, generating the electric image signal, and processing the electric image signal by k/GP×GH×GL, it is possible to increase the bit resolution and to improve the image quality of the reproduced visible image as compared with the case where the final read-out is conducted and the electric image signal is obtained by use of k corresponding to the fixed read-out condition.

BRIEF DESCRIPTION OF THE DRAWINGS

FIG. 3 is a schematic view showing an example of the external input means in FIG. 2, and FIGS. 4A and 4B are explanatory views showing the density condition of a visible image reproduced by the system of FIG. 2 when only the image of the lungs is recorded and when the image of the lungs is recorded together with that of the heart.

DESCRIPTION OF THE PREFERRED EMBODIMENTS

The present invention will hereinbelow be described in further detail with reference to the accompanying drawings.

Figure 1A:
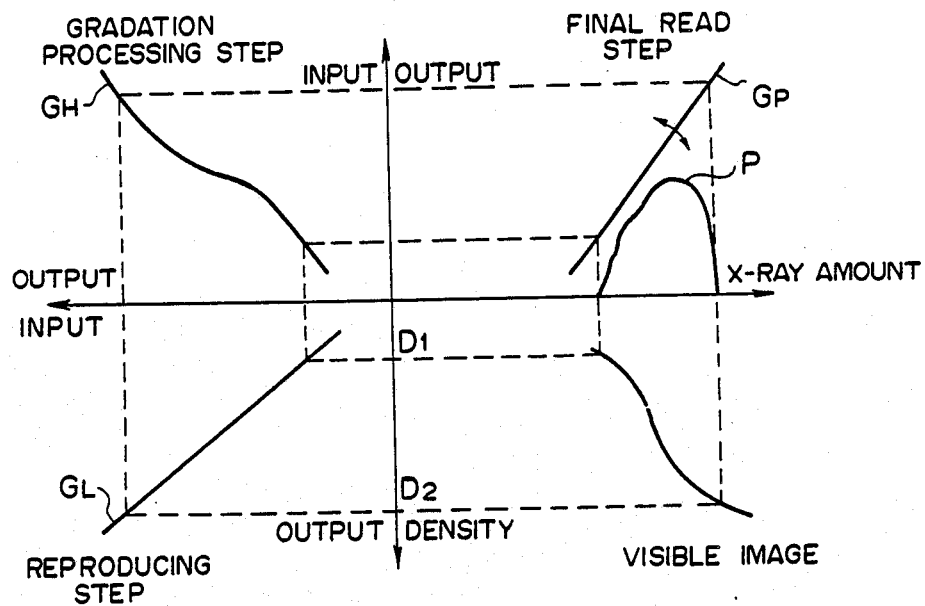
FIGS. 1A and 1B are explanatory views showing the density condition of a visible image reproduced by the conventional radiation image recording and reproducing system provided with the automatic sensitivity adjusting function when only the image of the lungs is recorded and when the image of the lungs is recorded together with that of the heart.
Figure 1B:
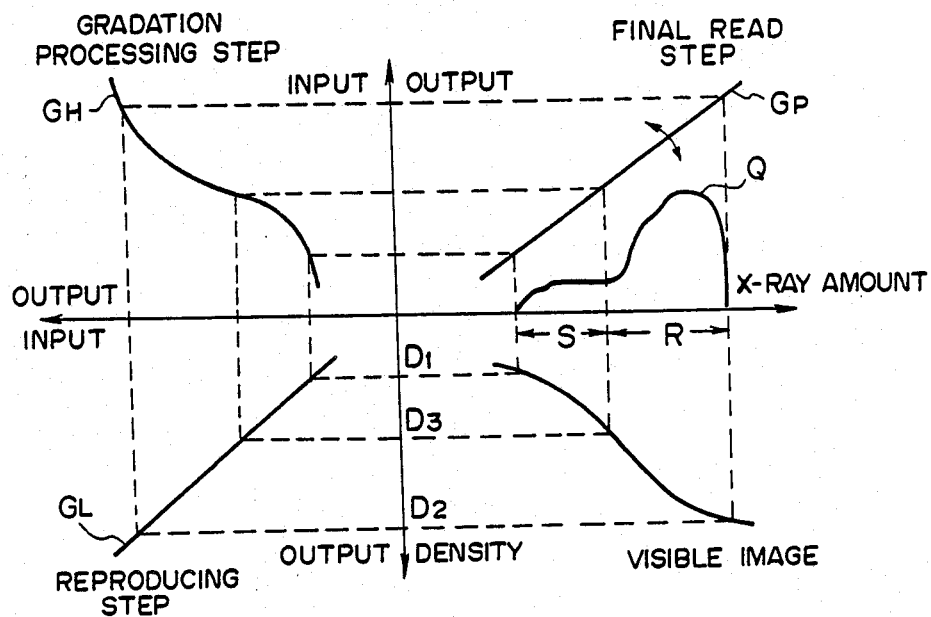
Figure 2:
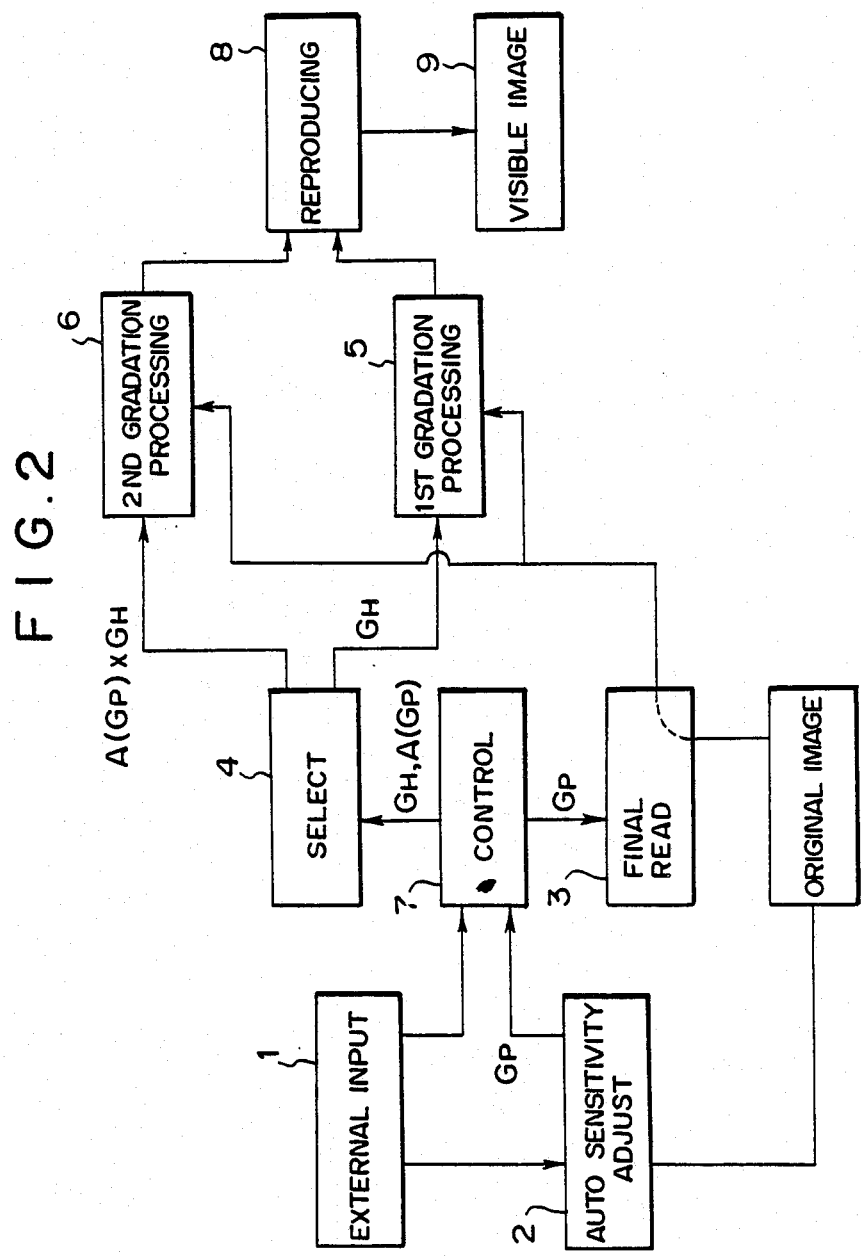
FIG. 2 is a block diagram showing the radiation image recording and reproducing system wherein an embodiment of the apparatus for carrying out the radiation image read-out and gradation processing method in accordance with the present invention is used.

Referring to FIG. 2, the apparatus of the present invention comprises an external input means 1, an automatic sensitivity adjusting means 2, a final read-out means 3, a selection means 4, a first gradation processing means 5, and a second gradation processing means 6.

The external input means 1 is used for entering a signal with respect to the image recording portion of an object and/or image recording conditions. As shown in FIG. 3, the external input means 1 is provided with pushbuttons for the image recording portions and the image recording conditions. By pressing the pushbuttons, signals with respect to the image recording portions and the image recording conditions are entered to the automatic sensitivity adjusting means 2 and a control means 7.

The automatic sensitivity adjusting means 2 conducts preliminary read-out for approximately detecting the radiation image information stored in a stimulable phosphor sheet (indicated as ORIGINAL IMAGE in FIG. 2) prior to final read-out by scanning the sheet by use of stimulating rays of a level lower than the stimulating rays used in the final read-out. On the basis of the image information detected by the preliminary read-out, the automatic sensitivity adjusting means 2 adjusts the read-out condition GP for the final read-out. The automatic sensitivity adjusting means 2 receives the signal with respect to the image recording portion and/or image recording conditions, which is entered by the external input means 1, and the preliminary read-out is conducted by use of conditions suitable for the image recording portion or the like on the basis of the signal entered to the automatic sensitivity adjusting means 2.

The read-out condition GP adjusted by the automatic sensitivity adjusting means 2 is sent to the final read-out means 3 via the control means 7.

The final read-out means 3 conducts the final read-out by scanning the stimulable phosphor sheet by stimulating rays which cause it to emit light in proportion to the radiation energy stored, detecting the emitted light by use of a photoelectric read-out means such as a photomultiplier, and converting the light into an electric image signal which is used to reproduce a visible image. The final read-out is conducted by use of the read-out condition GP sent from the automatic sensitivity adjusting means 2. The electric image signal generated by the final read-out means 3 is sent to the first gradation processing means 5 and the second gradation processing means 6 as described later.

On the other hand, the signal with respect to the image recording portion and/or image recording conditions, which is entered by the external input means 1, is sent to the control means 7. On the basis of the signal, the control means 7 sends the gradation processing condition GH predetermined to suit the corresponding image recording portion and/or image recording conditions and the value A(GP) of the function of the read-out condition GP, which is entered by the automatic sensitivity adjusting means 2, to the selection means 4, when $A(GP)=k/GP$, k/GP is entered.

On the basis of the signal with respect to the image recording portion and/or the image recording conditions, which is sent from the control means 7, the selection means 4 selects whether to process the electric image signal generated by the final read-out means 3 by use of the first gradation processing means 5 or the second gradation processing means 6. When the first gradation processing means 5 is selected, the selection means 4 sends a command to the means 5 for processing by use of the gradation processing condition GH. When the second gradation processing means 6 is selected, the selection means 4 sends a command to the means 6 for processing by use of the gradation processing condition $A(GP) \times GH$. A program for selecting the first gradation processing means 5 or the second gradation processing means 6 in accordance with the image recording portion and/or image recording conditions is stored in advance in the selection means 4, and the selection is conducted in accordance with the program.

The electric image signal processed by the first gradation processing means 5 or the second gradation processing means 6 is sent to an image reproducing apparatus 8 and is used to reproduce a visible image 9 on a photographic material or the like by use of an image reproducing condition GL.

In the present invention, even when an image of the lungs is recorded together with that of the heart, it is possible to obtain a visible image in which the gradation of the lungs is the same as when only the image of the lungs is recorded.

Figure 4A:
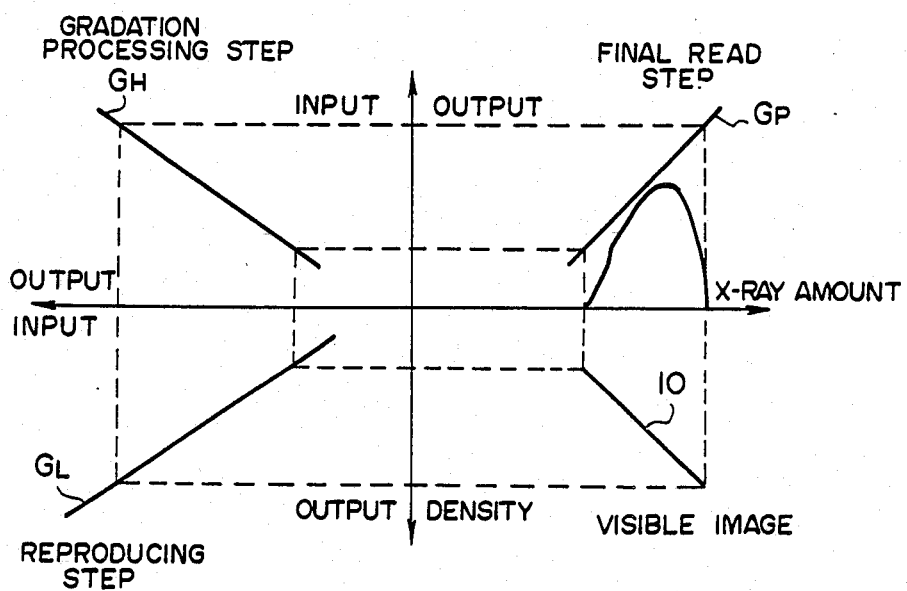
Figure 4B:
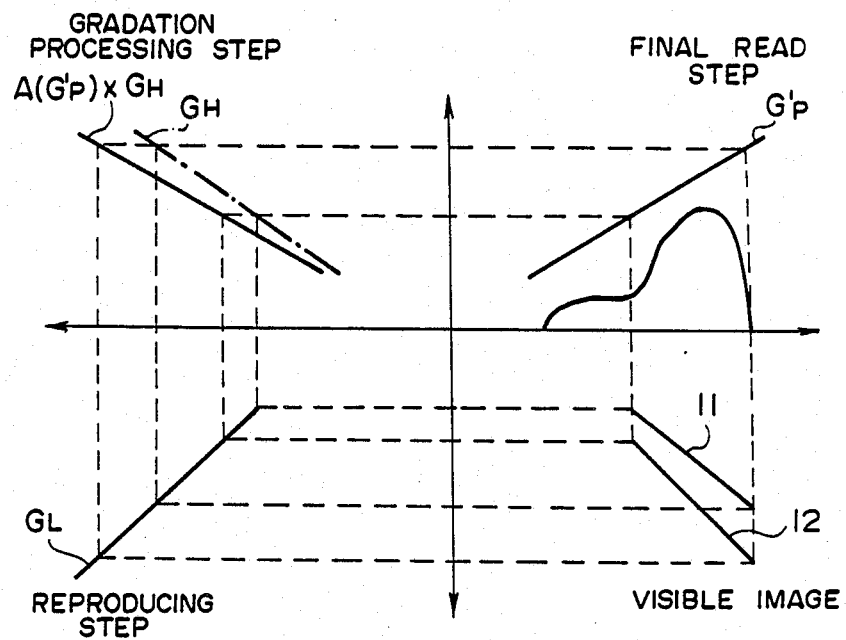

That is, as shown in FIG. 4A, when only the image of the lungs is recorded, a visible image processed by use of the total gradation processing condition $GT=GP \times GH \times GL$ is obtained, and the gradation of the lungs in the visible image is as indicated by the line 10. When the image of the lungs is recorded together with that of the heart, if the final read-out is conducted by use of a new read-out condition GP' determined by the automatic sensitivity adjusting means 2 and the obtained electric image signal is processed by use of the predetermined gradation processing condition GH by the first gradation processing means 5 in accordance with the conventional procedure, the gradation of the lungs in the reproduced visible image becomes as indicated by the line 11 in FIG. 4B, which is different from the gradation as indicated by the line 10 in FIG. 4A. However, in this case, when the second gradation processing means 6 is selected by the signal specified by the external input means 1 for conducting the magnification image recording of the lungs, the electric image signal obtained by use of the same read-out condition GP' is gradation-processed by use of the condition $k/GP' \times GH$. In this manner, the gradation of the lungs in the visible image becomes as indicated by the line 12 in FIG. 4B, which is the same as the gradation as indicated by the line 10 in FIG. 4A.

We claim:

1. A radiation image read-out and gradation processing method in which preliminary read-out for approximately detecting a radiation image of an object stored in a stimulable phosphor sheet is conducted by scanning the stimulable phosphor sheet by use of stimulating rays of a level lower than the level of the stimulating rays used in final read-out before an image signal is obtained by the final read-out for scanning the stimulable phosphor sheet by the stimulating rays which cause the stimulable phosphor sheet to emit light in proportion to the radiation energy stored and detecting the emitted light by a photoelectric read-out means, a read-out condition GP for the final read-out is determined on the basis of the image information obtained by the preliminary read-out, the final read-out is conducted by use of the read-out condition GP, and the image signal obtained by the final read-out is subjected to a gradation processing conducted by use of a predetermined gradation processing condition GH, wherein the improvement comprises selecting on the basis of the image recording portion of said object and/or image recording conditions whether to directly subject the image signal obtained by said final read-out to a gradation processing conducted by use of the predetermined gradation processing condition GH or to subject the image signal to a gradation processing conducted by use of a gradation processing condition $A(GP) \times GH$ where A(GP) denotes the function determined by the image recording portion of said object and/or image recording conditions, GP denotes said read-out condition, and GH denotes said predetermined gradation processing condition.

2. A method as defined in claim 1 wherein said read-out condition GP is a read-out scale factor.

3. A method as defined in claim 1 wherein said predetermined gradation processing condition GH is a non-linear transformation function.

4. A method as defined in claim 1 wherein $A(GP)=k/GP$ where k corresponds to a fixed read-out scale factor determined by the image recording portion and/or image recording conditions.

5. A radiation image read-out and gradation processing apparatus provided with a final read-out means for obtaining an image signal by scanning a stimuable phosphor sheet carrying a radiation image of an object stored therein by stimulating rays which cause the stimulable phosphor sheet to emit light in proportion to the radiation energy stored and by detecting the emitted light by use of a photoelectric read-out means, an automatic sensitivity adjusting means for conducting preliminary read-out for approximately detecting the image information stored in the stimulable phosphor sheet by scanning the stimulable phosphor sheet by stimulating rays of a level lower than the level of the stimulating rays of the final read-out means and for determining a read-out condition GP for the final read-out on the basis of the information obtained by the preliminary read-out, and a first gradation processing means for subjecting the image signal obtained by the final read-out conducted by use of the read-out condition GP to a gradation processing conducted by use of a predetermined gradation processing condition GH, the radiation image read-out and gradation processing apparatus comprising:

(i) a second gradation processing means for conducting a gradation processing by use of a gradation processing condition $A(GP) \times GH$ where $A(GP)$ denotes the function determined by the image recording portion of said object and/or image recording conditions, GP denotes said read-out condition, and GH denotes said predetermined gradation processing condition, (ii) an external input means for entering a signal with respect to the image recording portion of said object and/or image recording conditions, and (iii) a selection means for selecting said first gradation processing means or said second gradation processing means on the basis of the signal entered by said external input means.

6. An apparatus as defined in claim 5 wherein said read-out condition GP is a read-out scale factor.

7. An apparatus as defined in claim 5 wherein said predetermined gradation processing condition GH is a nonlinear transformation function.

8. An apparatus as defined in claim 5 wherein $A(GP) = k/GP$ where k corresponds to a fixed read-out scale factor determined by the image recording portion and/or image recording conditions.

* * * * *